United States Patent [19]
Nestell et al.

[11] Patent Number: 6,000,814
[45] Date of Patent: Dec. 14, 1999

[54] VEHICULAR COMPONENT ASSEMBLY WITH HARD COATED ELEMENT

[75] Inventors: David E. Nestell, Spring Lake; James T. Ainsworth, Allegan, both of Mich.

[73] Assignee: Donnelly Corporation, Holland, Mich.

[21] Appl. No.: 08/895,956

[22] Filed: Jul. 17, 1997

[51] Int. Cl.[6] ..................................................... F21V 31/02
[52] U.S. Cl. .......................... 362/267; 362/520; 362/549
[58] Field of Search ................................. 362/520, 546, 362/549, 267; 359/513

[56] References Cited

U.S. PATENT DOCUMENTS 5,552,970  9/1996  Takezawa et al. .................. 362/267 X
5,560,706  10/1996  Yamazaki et al. ...................... 362/549

OTHER PUBLICATIONS

A copy of four (4) photographs of a conventional lens and a gasket as shown in Figs. 14A and 14B, no date given.

*Primary Examiner*—Stephen Husar
*Attorney, Agent, or Firm*—Van Dyke, Gardner, Linn & Burkhart, LLP

[57] ABSTRACT

A vehicle component assembly includes a hard coated polymeric element with a resinous polymeric molded element or gasket integrally molded to a predetermined area thereof. Preferably, the element is a polycarbonate optical lens, such as a headlight lens, which is coated with a protective coating or hard coat which provides abrasion resistance and optionally includes ultraviolet radiation absorbers to protect the resinous polymeric molded element from UV radiation degradation. Adhesion is improved by priming the area of the polycarbonate element which receives the gasket with a primer coating. Preferably, the area to be gasketed is primed with a first adhesion promoting primer followed by a second adhesion promoting primer, wherein the first adhesion promoting primer improves the adhesion of the second primer to the protective coating, while the second primer, in turn, improves the adhesion of the molded element or gasket to the first primer and the hard coated element. The gasket is preferably molded on a peripheral portion of the element which may include grooves or other formed portions for mechanical interlocking the gasket with the polymeric element. Preferably, the gasket is formed from a melt-processible gasket material, such as polyvinyl chloride, thermoplastic urethane, or an ethylene-styrene polymer.

70 Claims, 8 Drawing Sheets

VEHICULAR COMPONENT ASSEMBLY WITH HARD COATED ELEMENT

TECHNICAL FIELD AND BACKGROUND OF THE INVENTION

This invention relates to vehicle components incorporating polymeric elements with members, casings or gaskets formed thereon and, more particularly, to vehicle component assemblies including vehicle exterior lighting assemblies such as a composite headlamp assembly incorporating a hard coated polycarbonate lens element bonded to a molded polymeric gasket.

In recent years, vehicle headlamp assembly designs have been driven by body styling demands. The lenses of the newer headlamp assemblies are more contoured so that they follow the contours of the vehicle body. Traditional headlamp assemblies typically included a stainless steel bezel which permitted the lens to be mounted in an opening in the vehicle body. More recently, headlamp assemblies include a preformed gasket which is subsequently attached, for example by an adhesive to the peripheral portion of the lens, which permits the lens to be fitted more closely with the body of the vehicle. Such preformed gaskets are, however, difficult to tool and, in some cases, their installation is difficult and labor intensive. Moreover, conventional lenses are now typically molded from a polycarbonate resin. Since polycarbonate lenses are vulnerable to abrasion from road debris and the elements and to discoloration from ultraviolet radiation, the lenses are coated with a hard coat to provide a durable outer surface which is resistant to scratching and which protects the polycarbonate lens from ultraviolet radiation. Heretofore, these hard coatings have inhibited adequate adhesion between the preformed gasket material and the lens. Consequently, in order to improve the adhesion of the gasket to the lens, some conventional gaskets and lenses include structures to provide mechanical interlocking of the gasket to the lens to supplement the bond provided by the adhesive.

Figure 14A:
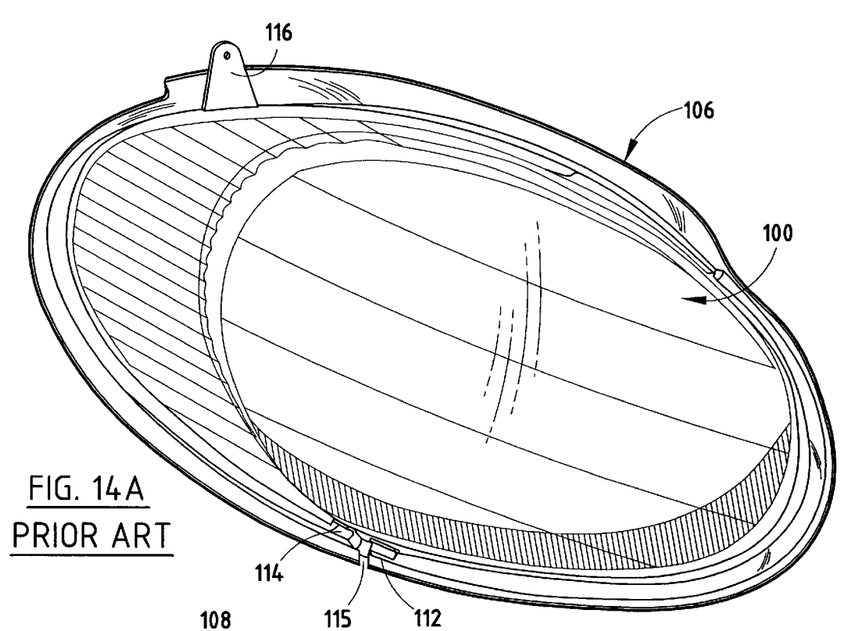
FIG. 14A is a rear elevational view of a conventional prior known, headlight lens assembly with a preformed gasket manually installed around the lens perimeter.
Figure 14B:
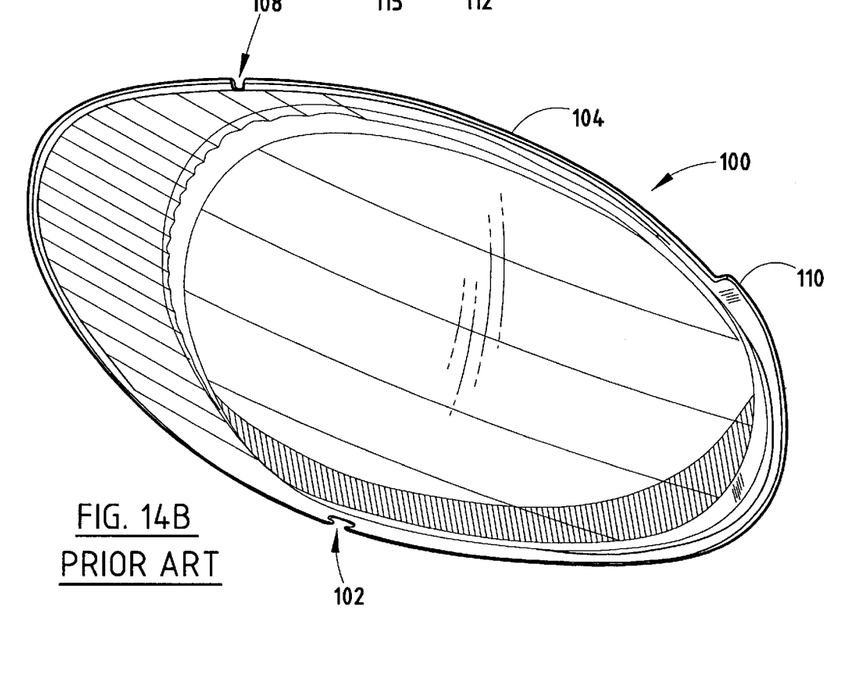
FIG. 14B is a rear elevational view of a conventional prior known, headlight lens with the gasket removed.

Referring to FIGS. 14A and 14B, one conventional, prior known polycarbonate lens (100) includes a first slotted groove (102) along its peripheral edge (104) to provide an anchorage for a conventional preformed gasket (106), as will be more fully described below, a second slotted groove (108) along its peripheral edge for aligning and holding the gasket while it is installed on the lens, and a projecting flange (110), which also assists in the alignment and retention of the gasket (106) on the lens during the installation process. As a result, the molding apparatus for the lens requires complicated tooling, and the lenses are subject to tight tolerances.

The preformed gasket (106) includes corresponding structures that interlock with the lens grooves and flange. To install the gasket, an adhesive is applied to the gasket or lens perimeter, and a first end (112) of the gasket is seated in the first slotted groove (102) to anchor one end of the gasket (106) while the gasket is stretched around the perimeter of the lens. As the gasket is stretched around the perimeter, an intermediate portion of the gasket is then seated in the second slotted groove (108) to align the gasket and provide further mechanical interlocking of the gasket to the lens. Then the second of end (114) of the gasket is wrapped around the perimeter of the lens and seated in the first slotted groove (102) adjacent the first end of the gasket such that the gasket ends define a break or space 115 (FIG. 14A). In this manner, these grooves and flange of the lens and corresponding structures on the gasket cooperate to align the gasket and to mechanically retain the gasket on the lens while the adhesive cures and provide mechanical interlocking of the gasket to the lens. Such process is often difficult and time consuming. Also, the retention of the gasket on the lens is sometimes less than adequate, as is the adhesion between the gasket and lens. While these gaskets have improved the fit-up of the headlamp assembly with the contoured vehicle body, the apparatus used to form these gaskets is also difficult and expensive to tool.

Further, gaskets (106) may be formed with retainers or tabs (116). The retainers (116) project from the gasket and secure to a housing by fasteners to provide a means for temporarily securing the lens and the gasket to the housing during installation. These retainers further complicate the molding process of the gasket. In some applications, the gasket is molded from two materials, with the second material forming the retainers having a greater durometer hardness to increase the stiffness of the gasket where the retainers project from the gasket. Again, this process increases the cost of the gasket and is also difficult to tool.

Despite the improved fit up, these preformed gaskets may not provide the desired life expectancy and may require reinstallation or replacement. Furthermore, because of the geometry of the gasket, there may also be a gap between the first and second ends of the gasket such as that shown at 115 in FIG. 14A. This gap may affect the aerodynamics of the vehicle body or the wind noise of the assembly. Moreover, installation of these preformed gaskets is labor intensive, requiring manual manipulation of the gasket around the lens. This manual manipulation may lead to worker fatigue and, ultimately, may increase the number of defective installations and the cost of the vehicle.

Consequently, there is a need for vehicle component assemblies which incorporate resinous elements, especially hard coated polycarbonate lenses of vehicle headlamp assemblies, and cooperating gaskets of molded members which will exhibit improved adhesion between the gasket or molded member and the resinous element. Moreover, there is a need for such assemblies which can be manufactured and installed with significantly reduced labor, time, and costs.

SUMMARY OF THE INVENTION

Accordingly, the present invention provides a vehicle component assembly such as a modular headlamp assembly which is ready for installation virtually entirely from the exterior of a vehicle or other supporting body in a manner which is heretofore been unknown. The headlamp assembly combines an optical element, typically formed of a polymeric material, such as a polycarbonate material, which has been shaped and coated with a protective coating to be ready for application in a headlamp assembly of a vehicle, and a flexible, resilient gasket which is integrally molded onto the perimeter of the optical element to provide a cover for the gap between the optical element and the opening of the vehicle body. The invention therefore eliminates the need for piecemeal assembly of the optical element and gasket of the headlamp assembly, while also providing a secure bond of the gasket material to the hard coated polycarbonate optical element to form a lens module, all in a molding process in a manner heretofore unknown.

According to one aspect of the invention, an optical component of a vehicle comprises an optical element having a peripheral portion and a gasket. The peripheral portion includes inner and outer peripheral side surfaces and a peripheral edge surface. The optical element includes a protective coating on at least one of the inner peripheral side surface, the outer peripheral side surface, and the peripheral edge surface, and a primer coating over at least a portion of the protective coating. The gasket is integrally molded on at least a portion of the primed portion on at least one of the inner peripheral side surface, the outer peripheral side surface, and the peripheral edge surface of the optical element. The gasket is thus bonded to at least a portion of the primed area of the optical element and includes extending portions at positions spaced from the optical element adapted to cover a gap between the optical element and the vehicle body.

In one form, the optical element comprises a polymeric optical element, such as a polycarbonate optical element. Furthermore, the optical element may comprise a lens, such as a headlamp lens. Preferably, the headlamp lens has a contoured surface wherein the contoured surface follows the contour of the body of the vehicle. The peripheral portion of the lens may include at least one cooperating structure, for example a groove which extends around at least a portion of the lens, a through-hole, or a lip, which provides mechanical interlocking of the gasket and the lens. In other aspects, a conventional lens element may be used, which typically includes one or more grooves extending into the peripheral edge surface of the lens.

In another form, the gasket material may comprise a melt-processible gasket material or a non melt-processible gasket material. For example, as suitable melt-processible gasket material includes polyvinyl chloride, styrene/butadiene/styrene (SBS) elastomers, styrene/ethylene/butadiene/styrene (SEBS) elastomers, copolyester elastomers, polyether blockamides, and thermoplastic urethane. Other suitable melt-processible gasket materials include cross-linked materials, for example styrene butadiene rubber (SBR) elastomer, ethylene propylene diene terpolymer (EPDM) elastomer, and ethylene propylene copolymer (EPM) elastomer. Suitable non melt-processible gasket materials include thermosetting reaction injection molded urethanes. Preferably, the gasket material has a hardness in a range of about 40 to 100 Shore A durometer. More preferably, the gasket material has a hardness in a range of about 55 to 100 Shore A durometer. Most preferably, the gasket material has a hardness in a range of about 65 to 85 Shore A durometer.

In yet further aspects, the protective coating comprises an organic hard coat, such as silicone, an inorganic hard coat, such as transition metal compounds, or an organic/inorganic hybrid hard coat, such as organic modified inorganics, for example a silicone modified silicon dioxide, which is applied to at least the outer, exposed surface of the optical element and protects the optical element from abrasion. Suitable inorganic hard coats include, for example, metal oxides, and metal nitrides. For example, metal oxides, such as silicon dioxide, may be used.

In another form, the optical component preferably includes ultraviolet radiation absorbers to protect the polycarbonate material from radiation damage, which are incorporated into the optical element and/or the protective coating. The ultraviolet radiation absorbers may be incorporated into an intermediate primer coating, which is applied to the optical element to improve the adhesion between the hard coating and the optical element.

According to another aspect of the invention, a vehicle lighting assembly includes a housing adapted for mounting in the body of a vehicle and a lens module mounted to the housing. The lens module includes a lens and a protective coating on at least an exterior surface of said lens, and a primer coating over at least a portion the protective coating. The lens module further includes a gasket integrally molded on at least a portion of the primed area and is adapted to cover a gap between the lens and the body of the vehicle. The gasket material preferably comprises either a melt-processible gasket material or a non melt-processible gasket material.

In one form, the lens module is secured to the housing, for example by ultrasonic welding or mechanical attachment, to provide a water tight seal between the lens module and the housing, which eliminates the need for forming or providing retainers on the gasket.

According to a further aspect, a vehicle component assembly includes a polymeric body having a protective coating thereon and at least one primer coating overlaying at least a portion of the protective coating. A member is integrally molded onto at least a portion of the primer coating, with the molded member extending away from the polymeric body adapted to extend between the body and the vehicle.

According to yet another aspect, a method of attaching a molded member to a polymeric vehicle element includes providing a polymeric vehicle element, applying a primer to a predetermined area of the element, and forming an integrally molded member on at least a portion of the predetermined area from a polymeric material. The vehicle element includes a protective coating to protect the vehicle element from abrasion and, preferably, ultraviolet absorbers to protect the vehicle element from ultraviolet radiation degradation.

In one aspect, the molded member is formed by injection molding a gasket material onto the vehicle element. Injection molding may include reaction injection molding the member onto the vehicle element. Preferably, the primer is applied to a peripheral portion of the vehicle element to improve the adhesion between the molded member and the vehicle element. More preferably, the vehicle element is primed with a first primer and then the first primer is primed with a second primer. The first primer is provided to increase the adhesion between the protective coated vehicle element and the second primer which, in turn, is adhered to the molded member.

In other aspects, the method further includes preheating the vehicle element, for example by applying warm air to the vehicle element. By preheating the vehicle element, the time for the primer or primers to flash is reduced, and the moldability of the part is improved.

The vehicle components and/or lighting assemblies of the present invention overcome the differences of curvature and dimensions between the vehicle element and the body panels of a vehicle by providing a resilient gasket or member formed on the element preferably by molding. The vehicle is preferably a polycarbonate element with a protective coating and protect the element from abrasion and, preferably, includes ultraviolet radiation absorbers to protect the element from ultraviolet radiation damage. The primer coating increases the adhesion between the molded gasket member and the protective coated element in a manner that provides superior adhesion characteristics heretofore unknown. Moreover, by molding the gasket or member onto the vehicle element, the assembly and installation time is significantly reduced thereby saving costs.

These and other object, advantages, purposes and features of the invention will become more apparent from the study of the foregoing description taken in conjunction with the drawings.

BRIEF DESCRIPTION OF THE DRAWINGS

FIG. 1;

DESCRIPTION OF THE PREFERRED EMBODIMENTS

Figure 1:
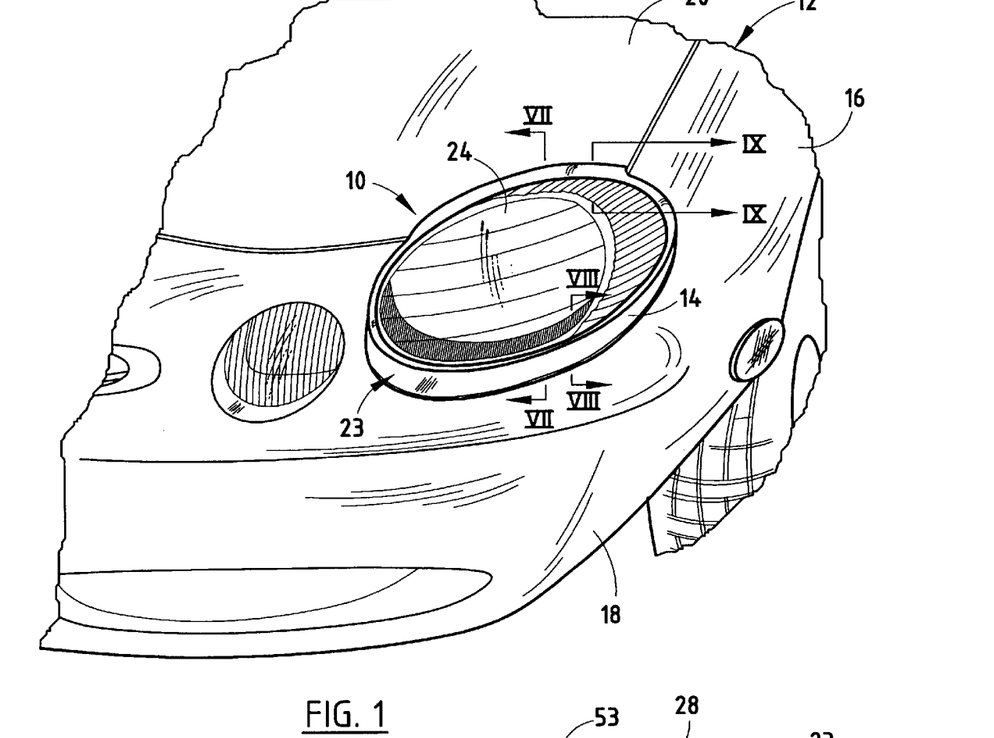
FIG. 1 is a perspective view of a first embodiment of the present invention comprising a headlamp assembly installed in a vehicle.

Referring now to the drawings in greater detail, FIG. 1 illustrates one form of a vehicle component assembly incorporating the present invention. One preferred form of this invention is a headlamp assembly 10 installed in the body of a vehicle 12. The headlamp assembly may include a lens module formed from a polymeric lens, for example a polycarbonate lens, which is coated with a transparent protective coating such as a silicone or ceramic hard coat but which also includes a molded polymeric member, which forms a gasket on the peripheral edge of the lens and is bonded securely and uniformly thereto in a heretofore unknown manner. As will be explained below, the present invention is useful for forming a wide range of vehicle component assemblies, especially where a gasket or other formed member must be securely attached to a protective coated polymeric element to form a complete assembly.

Figure 2:
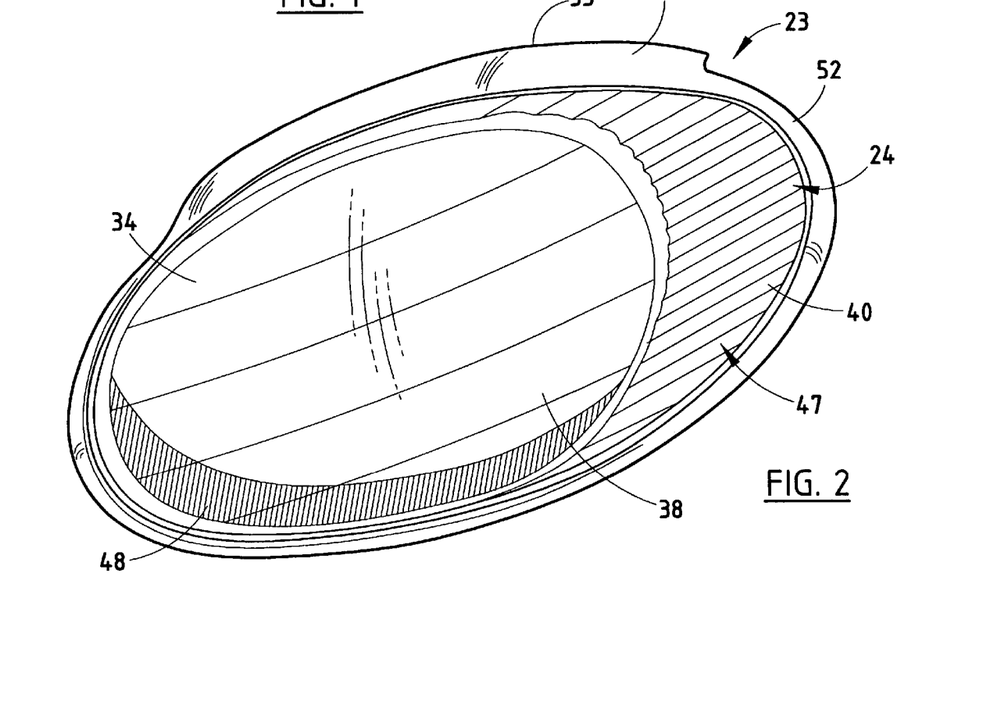
FIG. 2 is a front elevational view of the headlamp assembly of FIG. 2.
Figure 3:
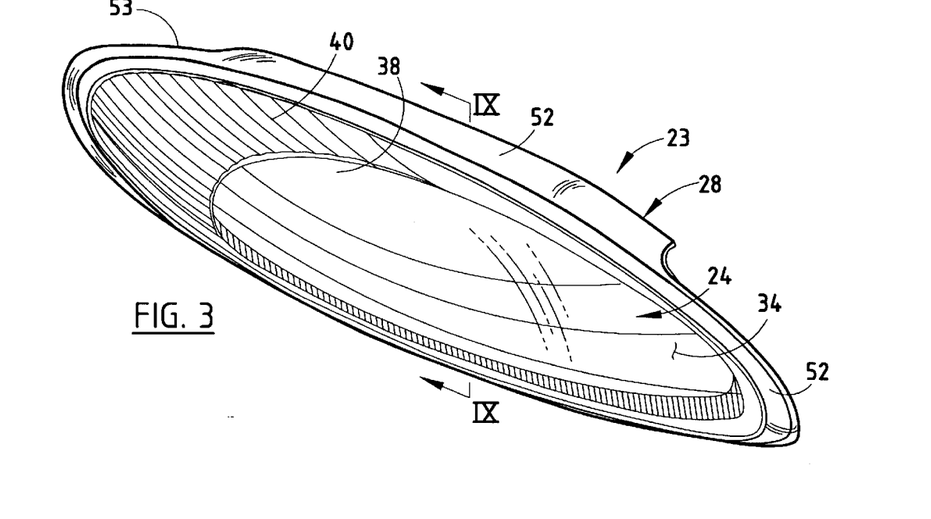
FIG. 3 is a top plan view of the headlamp assembly.
Figure 4:
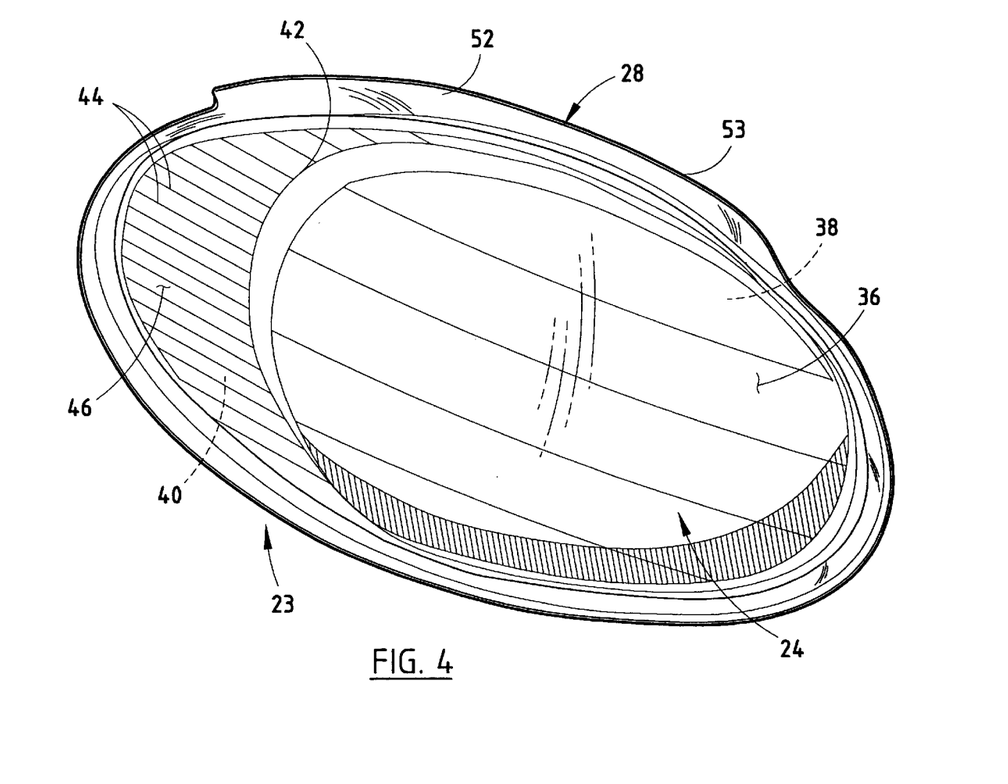
FIG. 4 is a rear elevational view of the headlamp lens assembly.
Figure 5:
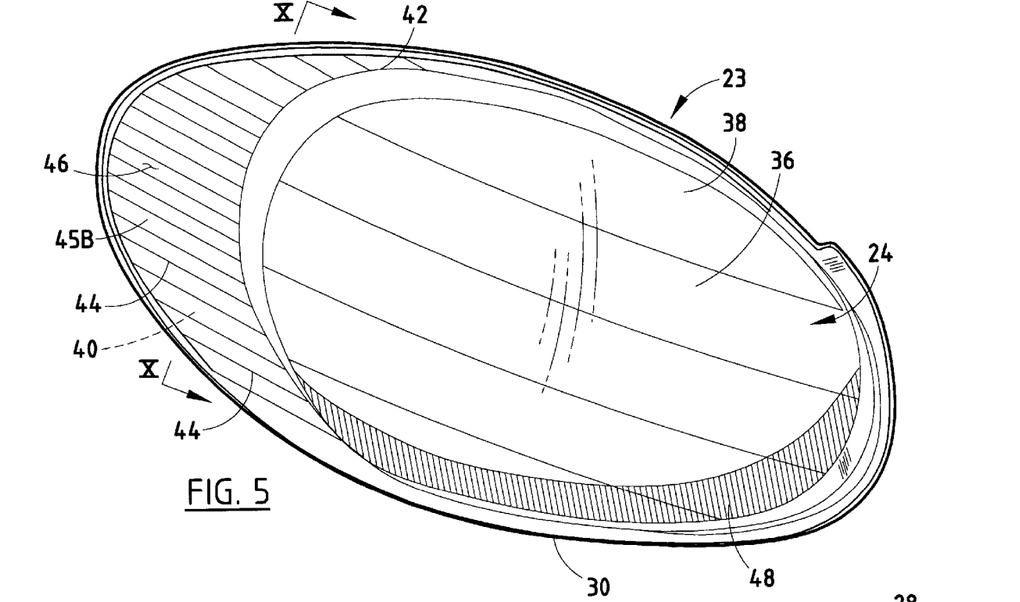
FIG. 5 is a rear elevational view of the protective coated polymeric lens of the present invention before formation of the molded member thereon.
Figure 6:
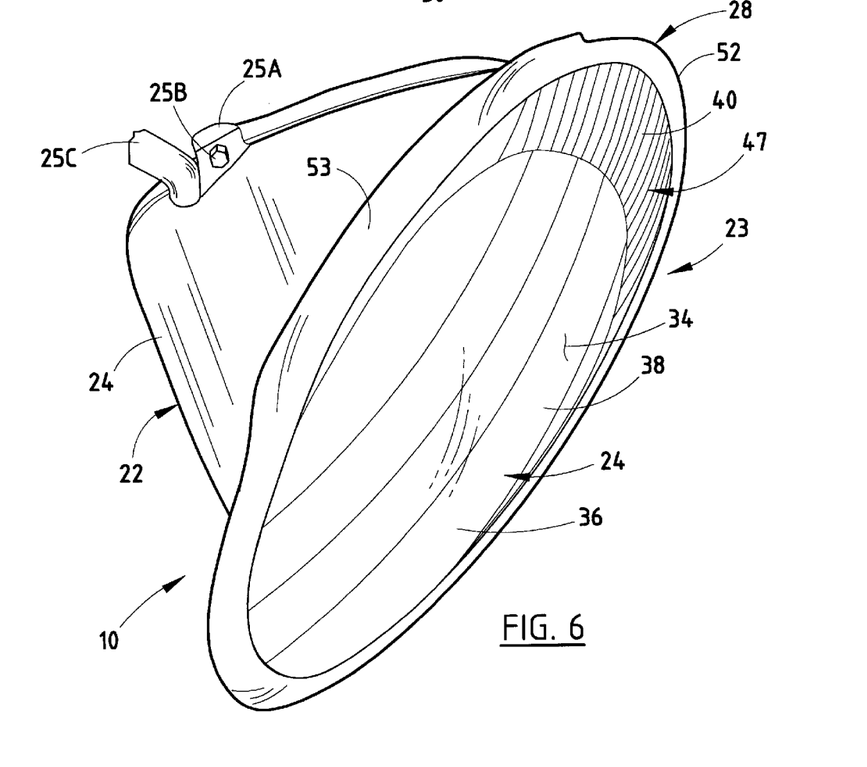
FIG. 6 is a perspective view of the headlamp assembly.

As shown in FIGS. 2–4, headlamp assembly 10 of the preferred embodiment has a peripheral outline or configuration design to match the contour of the body of vehicle 12. Headlamp assembly 10 is positioned in a recessed opening 14 between a fender 16, a bumper cover 18, and a hood 20 of the vehicle body. Headlamp assembly 10 includes a cylindrical housing 22 (FIGS. 6 and 7) and a lens module 23 formed from a contoured lens 24 which is mounted to a forward open end 22a of cylindrical housing 22 by welds 26 formed by ultrasonic welding (FIG. 7), as will be more fully described below. Housing 22 is preferably molded from a resinous plastic material such as polyvinyl chloride (PVC), and is mounted in the vehicle behind bumper cover 18 and adjacent fender 16 using conventional clips or projecting bosses 25a and fasteners 25b, so that lens 24 is aligned in opening 14 and is substantially flush with and follows the contour of the body of vehicle 12. The lamp (not shown) of the headlamp assembly is housed and supported in cylindrical housing 22 and is electrically coupled to the vehicle battery by wiring that is directed into the housing through a flexible conduit 25c, such as a rubber hose, that connects to a port (not shown) on the housing.

Figure 9:
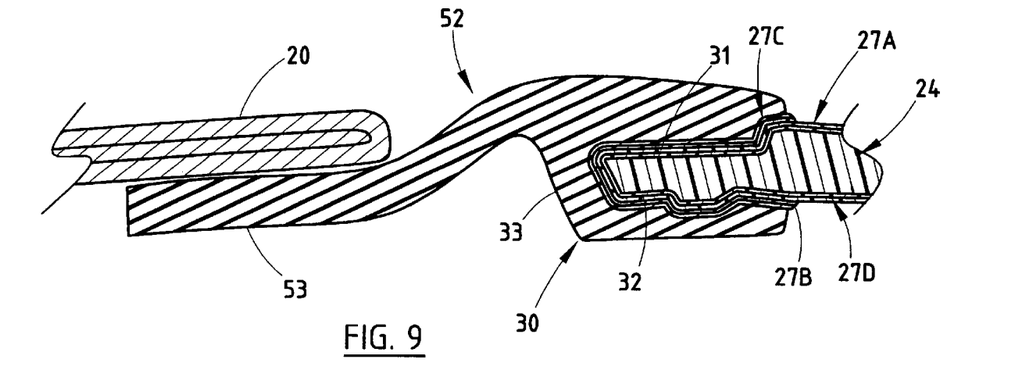
FIG. 9 is an enlarged cross-sectional view taken along line IX—IX of FIG.

Lens 24 is a polymeric lens preferably molded from a plastic resin, such as polycarbonate. More preferably, lens 24 comprises a GE LEXAN™ polycarbonate lens, available from General Electric Plastics. To protect lens 24 from deterioration from the elements, including rain, snow, ice, heat, and from abrasion damage from sand, dirt, cleaning cloths or devices, and the like, lens 24 is coated with a protective outer layer 27a (FIG. 9). Layer 27a may comprise an organic hard coat, an inorganic hard coat, or an organic/inorganic compound. Examples of organic hard coats include a silicone hard coat, such as AS4000 available from GE Silicones of Waterford, N.Y. or from Mitsubishi. Examples of an inorganic hard coat include transition metal compounds, for example a titanium or silicon dioxide.

To protect lens 24 from UV radiation degradation, lens module 23 preferably includes ultraviolet absorbers or stabilizers. For example, these ultraviolet radiation absorbers or stabilizers may be incorporated into an intermediate primer coating 27d, which is typically applied to lens 24 by the manufacturer to improve the adhesion between the protective hard coat 27a and lens 24. Intermediate primer coating 27d preferably comprises an acrylic based primer with optional UV absorbers or stabilizers incorporated therein, which reduce the UV light transmission. Alternatively, UV absorbers may be incorporated into the protective outer layer 27a, which may include a monomer composition that includes the UV absorbers. In addition or alternatively, lens module 23 may include such UV absorbers in the material forming lens 24. It can be appreciated from the foregoing that lens 24 may be protected from ultraviolet radiation damage either by incorporating UV absorbers into the material of the lens, in intermediate primer coating 27d, and/or in protective hard coating 27a. Such ultraviolet stabilizing agents should be substantially transparent in the visible regions and function to absorb ultraviolet radiation, quench degradation free radical reaction formation, and prevent degradative oxidative reactions.

Although many materials known to absorb ultraviolet radiation may be employed herein, preferred ultraviolet stabilizing agents include "UVINUL" 400 [2,4-dihydroxybenzophenone (manufactured by BASF Corp., Wyandotte, Mich.)], "UVINUL" D 49 [2,2'-dihydroxy-4,4'-dimethoxybenzophenone (BASF Corp.)], "UVINUL" N 35 [ethyl-2-cyano-3,3-diphenylacrylate (BASF Corp.)], "UVINUL" N 539 [2-ethylhexyl-2-cyano-3,3'-diphenylacrylate (BASF Corp.)], "UVINUL" M 40 [2-hydroxy-4-methoxybenzophenone (BASF Corp.)], "UVINUL" M 408 [2-hydroxy-4-octoxybenzophenone (BASF Corp.)], "TINUVIN" P [2-(2'-hydroxy-5'-methylphenyl)-triazole] (Ciba Geigy Corp.)], "TINUVIN" 327 [2-(3',5'-di-t-butyl-2'-hydroxyphenyl)-5-chloro-benzotriazole (Ciba Geigy Corp.)], "TINUVIN" 328 [2-(3',5'-di-n-pentyl-2'-hydroxyphenyl)-benzotriazole (Ciba Geigy Corp.)] and "CYASORB UV" 24 [2,2'-dihydroxy-4- methoxy-benzophenone (manufactured by American Cyanamid Co., Wayne, N.J.)], with "UVINUL" M 40, "UVINUL" M 408, "UVINUL" N 35 and "UVINUL" N 539 being the most preferred ultraviolet absorbing/stabilizing agents when used in a by-weight range of about 0.1% to about 15%, with about 4% to about 10% being preferred.

Ultraviolet radiation absorbing monomers may also be advantageously employed herein. Preferred among such monomers are 1,3-bis-(4-benzoyl-3-hydroxyphenoxy)-2-propylacrylate, 2-hydroxy-4-acryloxyethoxybenzophenone, 2-hydroxy-4-octoxybenzophenone and 4-methacryloxy-2-hydroxybenzophenone, as they perform the dual function of acting as a monomer component, or a portion thereof, and as an ultraviolet absorbing/stabilizing agent.

Further, ultraviolet absorbing layers may be coated onto, or adhered to, lens 24 to assist in shielding the lens from the degradative effect of ultraviolet radiation. Suitable ultraviolet absorbing layers include those recited in U.S. Pat. No. 5,073,012 entitled "Anti-Scatter, Ultraviolet Protected, Anti-Misting Electro-Optical Assemblies", filed Mar. 20, 1990, or as disclosed in co-pending U.S. patent application Ser. No. 08/547,578 filed Oct. 24, 1995, the disclosures of which are hereby incorporated by reference herein.

Examples of such ultraviolet absorbing layers include a layer of DuPont BE1028D which is a polyvinylbutyral/ polyester composite available from E. I. DuPont de Nemours and Company, Wilmington, Del., and SORBALITE™ polymeric UV blockers (available from Monsanto Company, St. Louis, Mo.) which comprise a clear thin polymer film, with UV absorbing chromophores incorporated, such as by covalent bonding, in a polymer backbone. The SORBALITE™ clear thin polymer film when placed on a surface of the lens to the source of UV radiation (such as the sun), efficiently absorbs UV light below about 370 nm with minimal effect on the visible region. Thickness of the SORBALITE™ film is desirably in the range of about 0.1 microns to 1,000 microns (or thicker); preferably less than 100 microns; more preferably less than about 25 microns, and most preferably less than about 10 microns. Also, UV absorbing thin films or additives such as cerium oxide, iron oxide, nickel oxide and titanium oxide or such oxides with dopants can be used to protect lens 24 from UV degradation. Further, as described above, UV absorbing chromophores can be incorporated, such as by covalent bonding, into intermediate layer 27d, lens 24 or into protective coating 27a to impart enhanced resilience to UV radiation. Also, near-infrared radiation absorbing species may be incorporated into lens 24, protective coating 27a, or intermediate layer 27d.

As best seen in FIGS. 2–5, lens module 23 includes an integrally molded member defining a gasket 28, which extends around the perimeter of lens 24 and projects outwardly from a peripheral edge 30 of lens 24 to cover the gap between lens 24 and fender 16, bumper cover 18, and hood 20 of vehicle 12. Notably, lens module 23 may comprise a pre-coated, pre-formed lens in which protective coating 27a has been applied using conventional techniques by the manufacturer. For example, protective coating 27a may be applied using in-molding techniques, chemical vapor deposition (CVD) techniques, for example low pressure or plasma enhanced CVD vacuum deposition techniques, such as evaporation or sputtering, or film transfer techniques, or the like. Alternatively, lens module 23 may comprise a pre-formed, uncoated lens, which optionally is received pre-formed and uncoated at the lens module assembly site, and which is then subsequently coated at the lens module assembly site with protective layer 27a using any one of the above mentioned techniques. For example, organic or inorganic protective coatings may be applied to the uncoated pre-formed lens using dip coating, spray coating, meniscus coating, spin coating, and flow coating. The inorganic protective coating may be additionally applied using vacuum deposition, evaporation depositing, sputtering depositing, or chemical vapor deposition, such as atmospheric or plasma assisted chemical vapor deposition, ion deposition techniques, or pyrolysis. Alternatively, the inorganic protective coating may be applied by a film transfer process. The protective coating is preferably cured thermally or by radiation UV energy.

Moreover, lens module 23 may be formed by a unitary molding operation in which lens 24 is molded from resin molded material and with the protective coating and any intermediate primer coatings being in-mold applied in the same mold, such as by use of transfer film, in-mold coating, a co-injection process, or the like. As these molding methods are conventionally known in the molding art, reference is made thereto without further description of the processes involved. Optionally, the molded member can be co-injected in a unitary molding process or may be molded in an adjacent operation immediately subsequently following the lens molding process. Whether lens 23 comprises a preformed, pre-coated lens, a pre-formed, uncoated lens, or a lens formed in a mold with the protective coating or coatings and gasket formed in the same mold, the final product comprises a lens module with an integrally formed molded member.

Gasket 28 may engage or flex and resiliently engage any one or more of fender 16, bumper cover 18, and hood 20 to enhance the aerodynamics of that portion of the vehicle body, e.g. hood 20 as in FIG. 9. Gasket 28 is preferably a melt processible material, such as a thermoplastic resinous material, for example polyvinyl chloride (PVC), or a block copolymer such as a styrene/butadiene/styrene (SBS) elastomer, a styrene/ethylene/butadiene/styrene (SEBS) elastomer, a copolyester elastomer, a polyether block amide, and a thermoplastic urethane. Suitable melt-processible materials also include physical blends and alloys such as polypropylene and EPDM, polyvinylendene chloride and ethylene vinyl acetate, thermoplastic olefins and EPDM, and PVC and nitrile rubber. Another class of suitable melt-processible materials includes multi-phase graft copolymers such as methacrylate/butadiene/styrene (MBS). Also, blends of the above polymers among themselves or with another polymer can also be a suitable material.

Some examples of block copolymers are KRATON™ D (which is SBS) and KRATON™ G (which is SEBS), both available from Shell Chemical Company, Troy, Mich.; HYTREL™ (a copolyester elastomer), available from DuPont Chemical, Wilmington, Del.; PEBAX™ (a polyether block amide), available from Elf Atochem North America Incorporated, Philadelphia, Pa.; ELASTOLLAN™ (a thermoplastic urethane), available from BASF, Wyandotte, Mich.; and PELLETHANE™ (a thermoplastic urethane), available from Dow Chemical Company, Midland, Mich.

Examples of physical blends and alloys include SANTOPRENE™ (a blend of polypropylene and EPDM), available from Advanced Elastomers, Auburn Hills, Mich.; ALCRYN™ (a blend of polyvinyledene chloride and ethylene vinyl acetate), available from DuPont Chemical, Wilmington, Del.; CHEMIGUM™ (a blend of PVC and nitrile rubber), available from Goodyear Tire and Rubber Company, Akron, Ohio; VINYPRENE™ (a blend of PVC and ethylene terpolymer), available from Vista Chemical Company, Houston, Tex.; 93-X 0401 A-80 (a blend of polypropylene and EPDM), available from Teknor Apex Company, Pawtucket, R.I.; and SARLINK™ 3000 (a blend of polypropylene and EPDM), available from DSM Thermoplastic Elastomers Incorporated, Leominster, Mass.

Alternatively, it may be desirable to use melt-processible materials that are cross-linkable such as by vulcanization. Examples of melt-processible gasketing material with a cross-linked structure formed from formulations with unsaturation in the polymer backbone are styrene butadiene rubber (SBR) elastomer and ethylene propylene diene terpolymer (EPDM) elastomer. Cross-linking between sites of unsaturation on adjacent polymer chains is achieved preferably via sulfur vulcanization as is commonly known. An example of a gasketing material formed from a formulation that is a peroxide cross-linkable system is ethylene propylene copolymer (EPM) elastomer. It should be those skilled in the art that where the molded member is formed from material requiring relatively high mold temperatures, for example EPDM, the material of lens 24, therefore, must be suitable and have sufficient heat deflection temperatures to withstand these higher processing temperatures.

Also, gasket 28 can be formed of melt-processible low-halogen or halogen-free polymer resin material such as resins based on polyolefins produced using metallocene catalysis. For example, ethylene-styrene interpolymers (ESI) can be used that are available from Dow Chemical, Freeport, Tex., and that, preferably, utilize Dow's INSITE™ single-catalyst technology wherein, depending on the amount of styrene incorporated, the solid state of the polymer can exhibit a variety of structures, including semi-crystalline and amorphous rubber. Alternatively, polyolefin based resins available from TOSOH Company of Tokyo, Japan and formed using TOSOH's CATALLOCENE™ metallocene catalysts technology can be used to form gasket 28.

Other suitable gasketing materials which are not melt-processible, are thermoset materials, such as those materials used in liquid injection molding processes, i.e., RIM urethanes.

Furthermore, gasket 28 is preferably molded from gasketing material having a hardness of about 40 to 100 Shore A durometer. More preferably, gasket 28 is molded from gasket material having a hardness of about 55 to 100 Shore A durometer. Most preferably, the gasketing material has a hardness of about 65 to 85 Shore A durometer.

Figure 13:
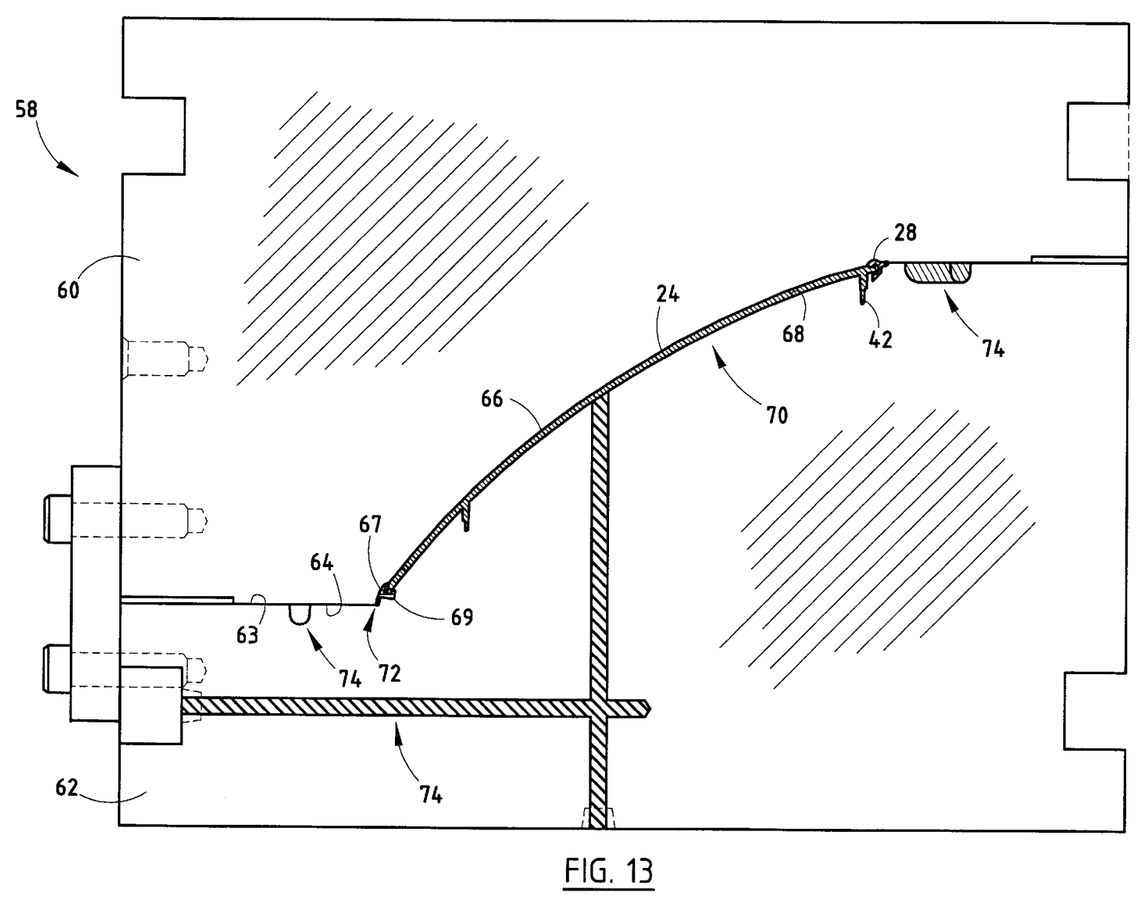
FIG. 13 is a cross-sectional view of a mold assembly used in forming the molded member about the periphery of the lens of the first embodiment headlamp lens assembly of the present invention.

Gasket 28 is integrally molded onto the peripheral edge 30 of lens 24 by a molding apparatus 58 (FIG. 13). As best seen in FIGS. 6–11, peripheral portion 30 of lens 24 includes an outer peripheral side surface 31, an inner peripheral side surface 32, and a peripheral edge surface 33. Preferably, protective layer or coating 27a is provided on at least the outer surface of lens 24 and extends over outer peripheral side surface 31. In the illustrated embodiment, protective coating 27a extends over both the outer surface and the inner surface of lens 24. But it should be understood that it may be more typical to provide protective coating 27a only on the exposed outer surface of lens 24. Furthermore, as described previously, lens module 23 may include intermediate primer coating 27d applied to lens 24 to promote the adhesion of protective coating 27a to lens 24. Outer peripheral side surface 31, inner peripheral side surface 32, and peripheral edge surface 33 each include a substantially planar or smooth molding surface 31a, 32a, and 33a, respectively, (FIG. 11) onto which the gasket material forming gasket 28 is molded, as will be fully described below. It should be understood that lens module 24 may be formed using a conventional lens element, such as lens 100 shown in FIG. 14A, may also be molded with gasket 28.

Furthermore, lens 24 may be formed or provided with one or more through-holes or other cooperating structures, for example grooves or channels, which are located in the region or area to be molded with molded member 28. The cooperating structures may be spaced or extend around at least a portion of the periphery of lens 24. The gasket material forming the molded member flows into these cooperating structures and thereby forms mechanical interlocking or bonding of gasket 28 to lens 24 to further enhance the integral bond between gasket 28 and lens 24. Referring to FIGS. 7–11, in the illustrated embodiment, lens 24 includes longitudinally extending ridges or grooves formed on inner and outer peripheral side surfaces 31 and 32 of portions of peripheral edge 30, with molding surfaces 31a and 32a defined by the bottom wall of the respective grooves. In this manner, the grooves form projecting lips 30a over at least a portion of peripheral edge 30 to provide mechanical bonding or interlocking of gasket 28 to lens 24.

As best seen in FIGS. 6–10, gasket 28 may be molded onto all three surfaces 31, 32, and 33 to provide a continuous seal and superior adhesion characteristics to the lens 24. However, it should be understood that gasket 28 may be molded on a single surface, for example inner peripheral side surface 32. In this manner, lens module 23 may be positioned flush with the outer surface and contour of the vehicle body and appear to be free floating in the recessed opening of the vehicle. Such a flush mounted application is particularly suitable for vehicles where the gap or spacing between the lens and the body of the vehicle is minimal. It should be also be understood that gasket 28 may be injection molded onto two sides of the lens 24, for example, the inner peripheral side surface and the peripheral edge surface of lens 24. In such case, the headlamp assembly can be positioned to achieve a flush mounting of the lens with respect to the body of the vehicle.

Figures 7, 8:
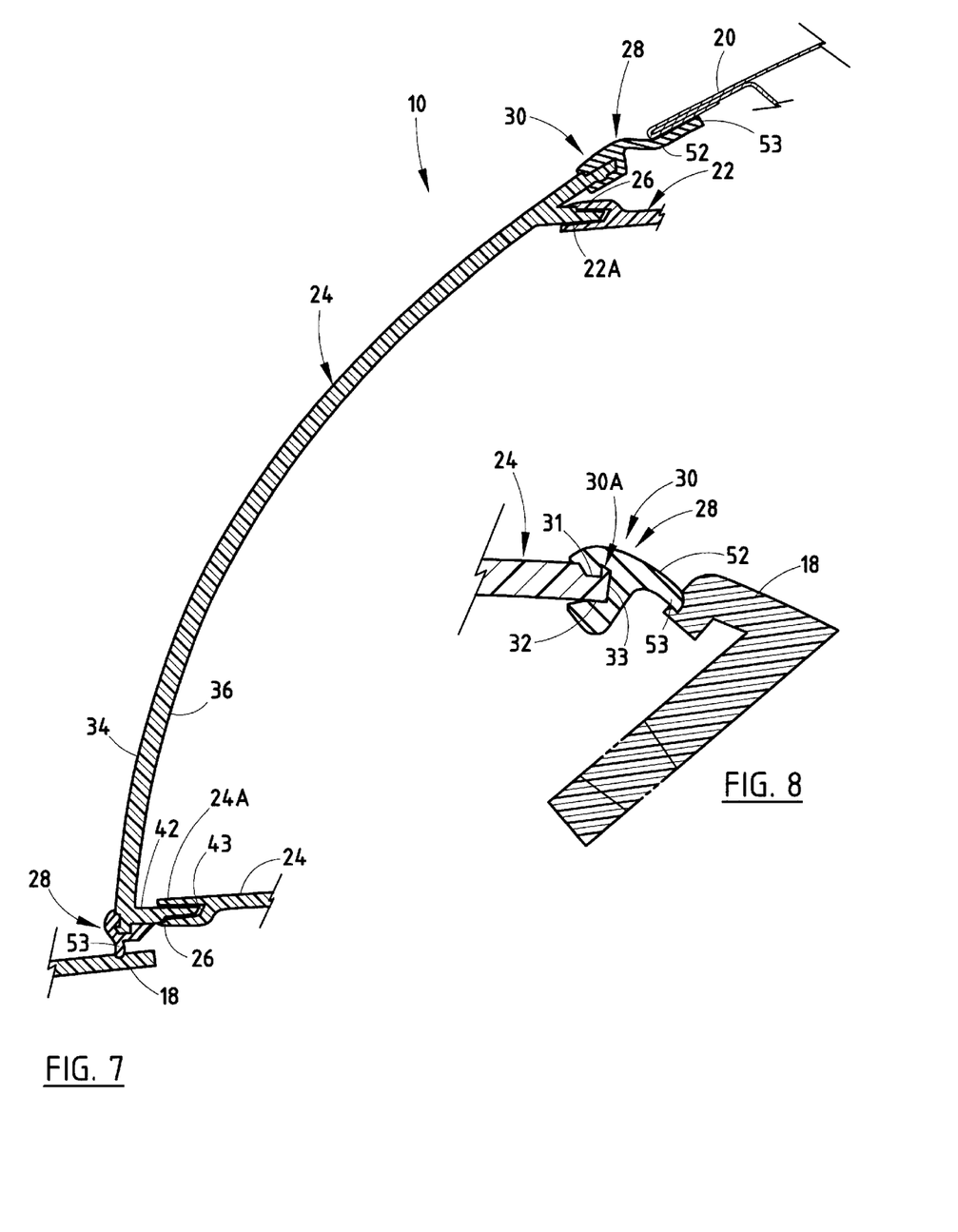
FIG. 7 is a cross-sectional view taken along line VII—VII of FIG. 1.
FIG. 8 is an enlarged cross-sectional view taken along line VIII—VIII of FIG. 1.
Figures 10, 11:
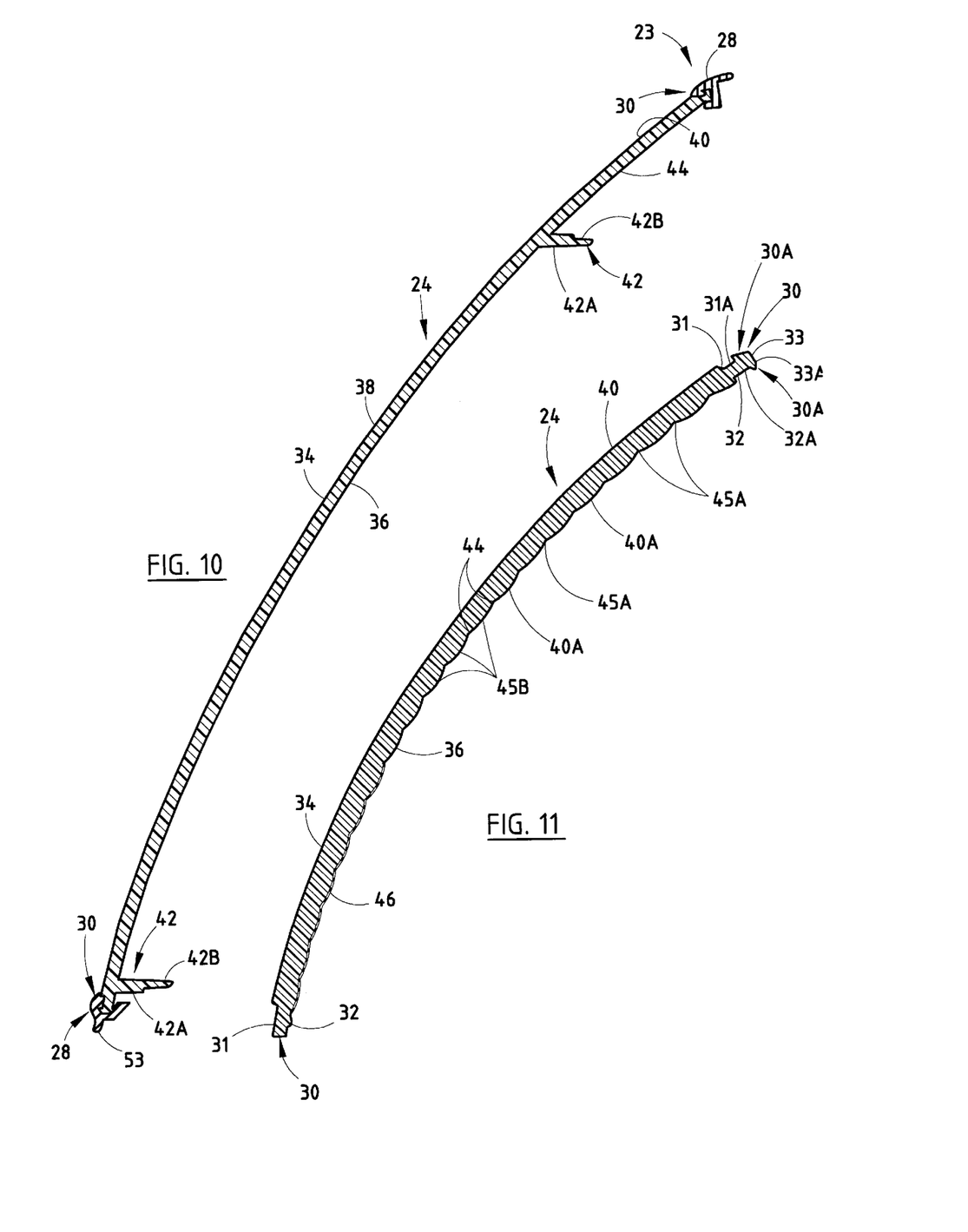
FIG. 10 is a cross-sectional view taken along line X—X of FIG. 3.
FIG. 11 is a cross-sectional view taken along line XI—XI of FIG. 5.

Referring to FIGS. 3–6, lens 24 includes an outer convex surface 34 and an inner concave surface 36. Outer concave surface 34 includes a transparent, light transmitting region 38 which is bounded on one side by a crescent shaped, non-transparent region 40. The inner surface of light transmitting region 38 includes a projecting flange 42 which extends around the perimeter of light transmitting region 38 and extends into housing 22. As best seen in FIGS. 7 and 10, flange 42 includes a base portion 42a and a projecting lip portion 42b. Forward open end 22a of housing 22 includes an annular groove or recess 43 into which projecting lip portion 42b of flange 42 extends. Flange 42 is preferably rigidly secured to forward end 22a of cylindrical housing 22, for example, by welding or an adhesive. Most preferably, flange 42 is secured to housing 22, preferably by heat staking, ultrasonic welding, or mechanical fastening, to form a fluid tight connection between lens module 23 and housing 22.

An inner surface 40a of non-transparent region 40 includes sharply defined, parallel optical lines 44 formed between parallel ridges or peaks 45b and valleys 45a. Inner surface 40a is coated with a reflective material 46, such as nickel chrome, or aluminum paint, to form a reflective area 47 which reflects light incident thereon from the outer, convex side 34 of the lens. In this manner, lens 24 also provides a reflective element so that when light from an on-coming car is directed onto reflective area 47, the driver of the on-coming vehicle will have a better view of vehicle 12 with the on-coming car approaches vehicle 12 from the side. In addition, lens 24 may include a second, crescent shaped shaded area 48 (FIGS. 2–5) formed by small, thin lines or ridges molded on the interior surface of the lens. Such lines or ridges form a fresnel lens area which diffuses the light transmitted from the headlamp. Reflective area 47, light transmitting area 38, and fresnel lens area 48 are bounded by peripheral edge 30.

Gasket 28 also includes a peripheral flange 52 which may have a varying lateral extent or dimension and thickness to accommodate different body styles and arrangements. Referring to FIGS. 2 and 6–8, flange 52 defines a thin, resilient, flexible lip 53, which may engage at least a portion of the perimeter of opening 14. As shown in FIGS. 7 and 8, the free end of lip 53 engages a recess or groove 34 in bumper cover 18 to seal out water, dirt and the like. In the illustrated embodiment, lip 53 may also extend a sufficient lateral distance away from lens edge 30 at a position spaced from the area where lip 53 engages bumper cover 18 to engage the underside of hood cover 20 (FIGS. 7 and 9). It should be understood, however, that the thickness and lateral dimension of lip 53 may vary according to the type and model of vehicle 12 and is generally provided to cover the gap between lens module 23 and the body of the vehicle.

The method of forming assembly 10 preferably begins with the cleaning of the surface of lens 24 to receive the gasket material by wiping with a suitable solvent, such as isopropyl alcohol, which removes oils or other dirt and debris. The alcohol mobilizes any contaminants and evaporates in a short period of time leaving substantially no residue to interfere or degrade the process. Following the cleaning of lens 24, and after sufficient time has lapsed to evaporate any remaining solvent, a coating 27b of a primer adhesive is applied to that portion or area of the protective coated lens which will receive molded gasket 28 (FIG. 9). It is preferred that the application of the primer adhesive be constrained to the peripheral edge of lens 24. The primer coating 27b improves adhesion of the gasket material to the protective coated lens. Preferably, the primer is applied to the surface of the lens prior to receiving gasket 28.

One example of such a primer has an acrylic base including an epoxy component, and may further include an adhesion-promoting agent such as a silane coupling agent, a titanium coupling agent, or a zirconium coupling agent. More preferably, where lens 24 comprises a protective coated polycarbonate lens, the area to be encapsulated with the gasket material is treated with a urethane glass primer before molding, such as Essex 43520A available from Essex Specialty Products, of Auburn Hills, Mich., or a solvent based acrylic primer, for example AS1100 available from Union Carbide or OSI.

In one embodiment, the primer adhesive is applied by a sprayer, wiper, roller, extruder, or other technique to the preferred thickness. Since it is anticipated that use of this invention will typically involve production of a large number of lenses, an automated application may be used. Preferably, the primer coating is applied to the area to be encapsulated using an applicator, such as a foam brush. The primer is allowed to flash completely over a period of time which, for the Essex primer, is up to about 15 minutes.

To further improve the adhesion between the gasket material and the coated polymeric lens, a second primer coating 27c may be applied onto the area previously coated with the first primer layer 27b. The second primer coating 27c preferably comprises a water based urethane glass primer, such as DX-4, which is available from Donnelly Corporation of Holland, Mich., and is applied using an applicator such as a foam brush. The first primer improves the adhesion between the protective coated polymeric lens and the second primer, and the second primer improves the adhesion between the gasket and the first primer. Similarly, the second primer is allowed to flash completely over a period of time. For the Donnelly primer, such period is up to about 60 minutes. It should be understood that the primers described herein, namely the Essex and the Donnelly primers, have been found particularly suitable when molding a PVC member, such as a gasket, onto a polycarbonate element that has been coated with either the GE AS4000, Mitsubishi, or Bayer protective coatings. Other primers may also be used depending on the particular protective coating and on the desired gasket material.

Subsequent to the application of the primer adhesive coatings, the lens substrate may optionally be preheated to a temperature no greater than 160° F., and more preferably to a temperature between 100° F. and 160° F. Most preferably, lens 24 may be preheated to a temperature of about 130° F. By heating lens 24, the primer coatings flash at a faster rate. Preheating the primed lens may be accomplished by infrared heating and, preferably, by directing warm air onto the primed lens. It has been found that by heating the lens and the adhesive primer to a temperature less than 160° F. and maintaining that temperature up through the time the gasket is formed on the lens, an exceptionally strong bond and water resistant barrier is formed between the lens and the gasket. The minimum temperature for a primer adhesive at which such a bond occurs is known as the "primer transition temperature." The primer transition temperature may also be defined as that temperature for a given primer where the adhesive quality significantly changes and improves. Alternatively, the primed, protective coated lens may be plasma activated before molding.

The primed, protective coated polymeric lens and any attachments are then loaded into molding apparatus 58. Preferably, lens module 23 is formed by integrally molding lens 24 with gasket 28 in a clear and essentially dust free environment. The gasket material is molded onto lens 24 preferably by injection molding. Furthermore, gasket 28 used in accordance with this invention, as described above, is preferably made from a melt-processible material which requires the application of heat to mobilize or melt the material. Heat is required to process the melt-processible material under conventional molding techniques such as injection molding, extrusion, blow molding, compression molding, and similar techniques. The application of heat during molding further improves the adhesion between the gasket 28 and the hard coated lens. Moreover, heat may be applied to the molded, hard coated lens after the molding process is complete, which may further increase the adhesion of gasket 28 to the hard coated lens. Therefore, lens 24 may be heated before, during, and/or after the molding process to increase the adhesion between gasket 28 and lens 24.

Figure 12:
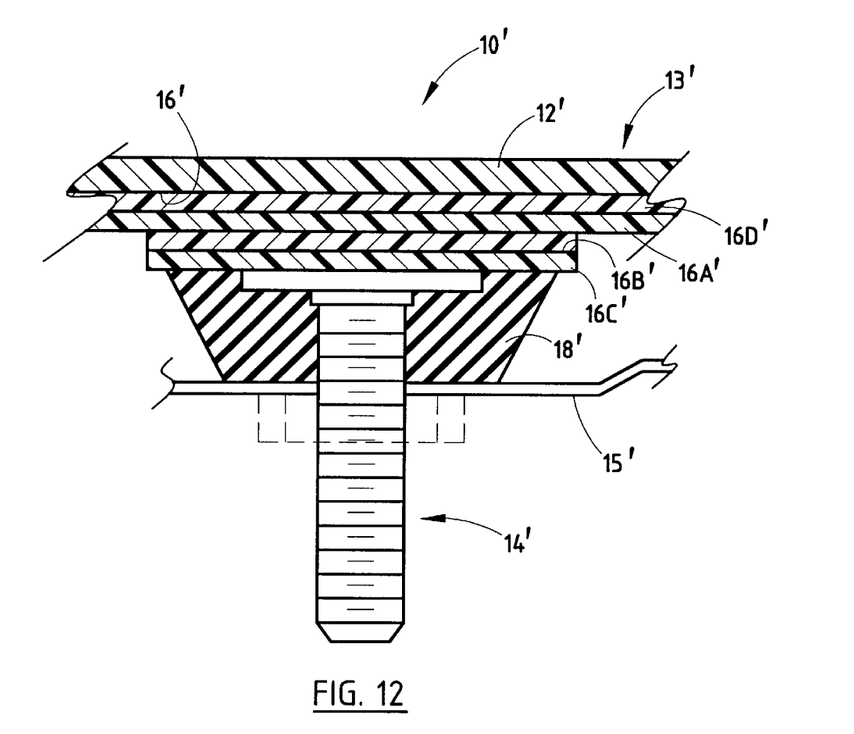
FIG. 12 is a cross-sectional view of a second embodiment of the present invention comprising a decorative panel assembly.

Although the present invention has been described in reference to molding the perimeter or peripheral portion of a polymeric element, it should be understood that molding may be carried out on intermediate portions of a polymeric element using this process. For example, referring to FIG. 12, a decorative trim assembly 10' may include a panel 12' with a fastener or attachment 14' adhered to an inner side 16' of panel 12' for securing panel 12' to the body 15' of a vehicle. Fastener 14' may be adhesively bonded to inner side 16' by a suitable adhesive and then a spacing or sealing member 18' may be molded there around. Alternatively, fastener 14' may be encapsulated by molded member 18' thus eliminating the need for an adhesive between panel 12' and fastener 14'. In order to obscure the view of the fastener 14' and molded member 18', panel 12' may include an opaque coating or frit coating on the inner side 16' of panel 12'. In a similar manner to the previous embodiment, a modular panel 13' is formed by molding member 18' on panel 12'. Panel 12' comprises a polymeric panel with a protective coating 16a' and an optional intermediate primer coating 16d' similar to that described in the previous embodiment. In the same manner, the area on which molded member 18' is to be molded is primed with at least one adhesive promoting primer coating 16b' and, preferably, with a second primer coating 16c'. Reference is made to the earlier embodiment 10 for examples of the protective coating, intermediate primer coating, ultraviolet radiation absorbers/stabilizers, suitable adhesion promoting primers, and suitable gasket or seal materials. It should be understood that various other vehicle components, such as trim assembly 10', may include gaskets or moldings formed thereon at various positions without the necessity of fasteners such as that at 14' bonded to the panel or substrate prior to forming the molded member.

As best seen in FIG. 13, molding apparatus 58 comprises an injection mold with a single cavity. It should be understood that a multiple cavity mold may also be used. Furthermore, molding apparatus may comprise a co-injection molding apparatus so that lens module 23 may be formed by in-molding, in which all or some of the components are injected to form either an intermediate product, such as a coated lens, or the final product, a lens module formed from a protective coated lens with an integrally molded member.

In the illustrated embodiment, molding apparatus 58 comprises a single mold apparatus and includes upper and lower plates 60 and 62, respectively each defining upper and lower parting lines 63 and 64, respectively. Plates 60 and 62 are respectively configured to hold lens 24 therebetween when clamped together as shown. Upper plate 60 includes a cavity 66 formed in its lower surface to receive lens 24 and defines the upper surface of a mold cavity 72 for gasket 28. It should be understood that cavity 66 may be configured to accept any desired curved or shaped lens and may accommodate a wide range of gasket dimensions and thicknesses. In the embodiment shown, lower plate 62 includes a support surface 68 for lens 24 and the lower surface of mold cavity 72, which, together with cavity 66, defines a lens cavity 70 and the mold cavity 72. Mold cavity 72 is in fluid communication with a runner system 74, which in turn is in fluid communication with a nozzle (not shown) of a conventional plastic injection machine. Preferably, runner system 74 is centrally located and configured within lower plate 62 to direct the gasket material to mold cavity 72 through at least two gates (not shown), which are positioned on opposed ends of lens cavity 70 on the parting line 63 of lower plate 62. In this manner, the gasket material is injected uniformly into cavity 72. It should be understood that the number of gates can be increased as needed to increase the flow of gasket material to cavity 72 and to assure a more uniform flow.

Additionally, the lower and upper plates 60, 62, respectively, have been configured to form a mold cavity that forms a three-sided encapsulation about peripheral edge 30 of lens 24. As it should be understood from the description of lens module 23, mold cavity 72 may be configured for encapsulating one or two sides of lens 24 or for forming a molded member on an intermediate portion of a polymeric element or for forming a molded member with an attachment member encapsulated in the molded member.

In the illustrated embodiment, mold apparatus 58 is a vertical mold apparatus. The vertical configuration of mold apparatus 58 has the advantage that lens module 23 is The opening and closing of mold apparatus 58 is achieved using conventional methods. For example, upper plate 60 may be mounted on a third fixed plate and can be guided by guide pins, hydraulic cylinders, or the like (not shown). Alternatively, a hinge mechanism (not shown) can also be used with the upper or lower plate 60, 62. When at the fully open mold position, lens 24 may be placed on the support surface of lower plate 62. After loading the lens into mold apparatus 58, and after the mold is closed as shown in FIG. 11, the melt-processible gasketing material is injected into the mold cavity 72. Upon filling of the mold and substantial completion of any set up, cure, and/or cross-linking reactions in the gasketing material, the mold is opened. The lens module 23 can then be removed from mold apparatus 58 which is then ready for another lens in a new cycle.

Although the present invention is described in reference to a headlamp assembly and to a decorative panel assembly, it should be understood that the present invention may be used in numerous other applications, including other vehicle component assemblies incorporating protective coated polymeric elements, especially protective coated polycarbonate elements. Other vehicle component assemblies include: window assemblies incorporating a polymeric window element or panel, trim assemblies incorporating protective coated polymeric elements, reflective element assemblies, and other lighting assemblies, for example tail lights and interior lighting assemblies. Furthermore, as described previously, module 23 may be formed using several processes. Optionally, lens module 23 is formed using a pre-formed, pre-coated lens which is primed, as described above, and then placed in an injection molding apparatus which integrally molds molded member 28 onto the primed, pre-formed, pre-coated lens. However, lens module 23 may also be formed by using a pre-formed uncoated lens which is then subsequently coated with a protective coating using any one of the conventional techniques described previously. After coating, the coated lens is then primed and molded with molded member 28 as described above to form lens module 23. Alternatively, lens 24, coatings 27a–27d, and molded member 28 may be formed in a single mold such as, co-injection machine or molded in stages in adjacent injection/co-injection molding machines. Alternatively, the molded member 28 may be formed around the perimeter of the coated lens using an extrusion process that extrudes the polymer material that forms the molded member 28 from a shaped extrusion head. The shaped extrusion head extrudes the desired shape profile of the polymer material, including the gap closing flange and lip, and moves around the perimeter of the lens such as by mounting on a robot arm.

While several forms of the invention have been shown and described, other forms will now be apparent to those skilled in the art. Therefore, it will be understood that the embodiment shown in the drawings and described above are merely for illustrative purposes and not intended to limit the scope of the invention which is defined by the claims which follow.

The embodiments of the invention in which an exclusive property or privilege we claim are defined as follows:

1. A vehicular lighting assembly optical component for a vehicle, the vehicle having a body and an opening in the body, said vehicular lighting assembly optical component comprising:

a polymeric optical element having a peripheral portion, said peripheral portion having inner and outer peripheral side surfaces and a peripheral edge surface, said polymeric optical element including a protective coating and a primer coating, said protective coating being on at least one of said inner peripheral side surface, said outer peripheral side surface, and said peripheral edge surface, said primer coating being on a predetermined area of said protective coating; and a gasket material integrally molded on and bonded to at least a portion of said primed area on at least one of said inner peripheral side surface, said outer peripheral side surface, and said peripheral edge surface of said polymeric optical element, said gasket material having extending portions at positions spaced from said optical element adapted to cover a gap between said polymeric optical element and the opening in the body.

2. A vehicular lighting assembly optical component according to claim 1, wherein said polymeric optical element comprises a polycarbonate optical element.

3. A vehicular lighting assembly optical component according to claim 2, wherein said optical element comprises a lens.

4. A vehicular lighting assembly optical component according to claim 3, wherein said gasket material is injection molded on at least a portion of said primed area on at least said inner peripheral side surface and said peripheral edge surface of said lens.

5. A vehicular lighting assembly optical component according to claim 4, wherein said lens includes at least one cooperating structure mechanically interlocking said gasket material with said lens.

6. A vehicular lighting assembly optical component according to claim 5, wherein said cooperating structure comprises a groove, said groove extending around at least a portion of said peripheral portion of said lens.

7. A vehicular lighting assembly optical component according to claim 5, wherein said cooperating structure comprises one of a lip and a spaced through-hole mechanically bonding said gasket and said lens.

8. A vehicular lighting assembly optical component according to claim 1, wherein said primer coating comprises a first primer coating, said optical element including a second primer coating between said first primer coating and said gasket material, said first primer coating increasing the adhesion of said second primer coating and gasket material to said protective coating.

9. A vehicular lighting assembly optical component according to claim 1, wherein said gasket material comprises one of a melt-processible gasket material and a non melt-processible gasket material.

10. A vehicular lighting assembly optical component according to claim 9, wherein said gasket material comprises a melt-processible gasket material selected from the group including polyvinyl chloride, a styrene/butadiene/styrene elastomer, a styrene/ethylene/butadiene/styrene elastomer, a copolyester elastomer, a polyether blockamide, a thermoplastic urethane, a styrene butadiene rubber elastomer, an ethylene propylene diene terpolymer elastomer, and an ethylene propylene copolymer elastomer.

11. A vehicular lighting assembly optical component according to claim 9, wherein said gasket material comprises a urethane.

12. A vehicular lighting assembly optical component according to claim 1, wherein said polymeric optical element comprises a lens.

13. A vehicular lighting assembly optical component according to claim 12, wherein said lens comprises a head lamp lens and includes a contoured surface adapted to follow the contour of the body of the vehicle.

14. A vehicular lighting assembly optical component according to claim 13, wherein said lens comprises a polycarbonate lens.

15. A vehicular lighting assembly optical component according to claim 1, wherein said protective coating is transparent.

16. A vehicular lighting assembly optical component according to claim 1, wherein said protective coating comprises one of an organic coating, an inorganic coating, and an organic/inorganic coating.

17. A vehicular lighting assembly optical component assembly according to claim 16, wherein said protective coating comprises a silicone coating.

18. A vehicular lighting assembly optical component assembly according to claim 16, wherein said protective coating comprises one of a silicon dioxide and a titanium dioxide.

19. A vehicular lighting assembly optical component assembly according to claim 16, wherein said protective coating comprises a silicone modified metal oxide.

20. A vehicular lighting assembly optical component assembly according to claim 1, wherein said optical component includes an ultraviolet radiation absorber/stabilizer.

21. A vehicular lighting assembly optical component assembly according to claim 20, wherein said ultraviolet radiation absorber/stabilizer being incorporated into one of said optical element and said protective coating.

22. A vehicular lighting assembly optical component assembly according to claim 20, wherein said ultraviolet radiation absorber/stabilizer is incorporated into said protective coating.

23. A vehicular lighting assembly optical component assembly according to claim 20, wherein said optical element further includes an intermediate primer coating between said optical element and said protective coating, said ultraviolet radiation absorber/stabilizer being incorporated into said intermediate primer coating.

24. A vehicular lighting assembly optical component according to claim 1, wherein said peripheral edge surface is substantially smooth.

25. A vehicular lighting assembly optical component according to claim 1, wherein said peripheral portion includes a cooperating structure, said cooperating structure mechanically bonding said gasket material to said polymeric optical element.

26. A vehicle lighting assembly, said vehicle lighting assembly comprising:

a housing; and a lens module mounted to said housing, said housing being adapted for mounting in an opening of a vehicle, said lens module including a lens having an exterior surface, a peripheral edge and a peripheral portion adjacent said peripheral edge, said lens module including a protective coating on at least said exterior surface for protecting said lens from abrasion, a primer coating over at least a portion of said protective coating, and a gasket integrally molded on at least a portion of the primed portion, and said gasket being adapted to cover a gap between the vehicle opening and said lens.

27. A vehicle lighting assembly according to claim 26 wherein said lens comprises a polycarbonate lens.

28. A vehicle lighting assembly according to claim 26, wherein said gasket comprises one of a melt-processible gasket material and a non melt-processible gasket material.

29. A vehicle lighting assembly according to claim 28, wherein said gasket comprises a melt-processible gasket material selected from the group including polyvinyl chloride, a styrene/butadiene/styrene elastomer, a styrene/ethylene/butadiene/styrene elastomer, a copolyester elastomer, a polyether blockamide, a thermoplastic urethane, a styrene butadiene rubber elastomer, an ethylene propylene diene terpolymer elastomer, and an ethylene propylene copolymer elastomer.

30. A vehicle lighting assembly according to claim 28, wherein said gasket comprises a urethane.

31. A vehicle lighting assembly according to claim 26, wherein said primer coating comprises a first primer coating, said lens module including a second primer coating, said first primer coating improving the adhesion of said second primer coating and said gasket material to said protective coating.

32. A vehicle lighting assembly according to claim 26, wherein said peripheral portion of said lens has an inner peripheral side surface, an outer peripheral side surface, and a peripheral edge surface, said gasket being molded onto at least one of said inner peripheral side surface, said outer peripheral side surface, and said peripheral edge surface, said at least one of said inner peripheral side surface, said outer peripheral side surface, and said peripheral edge surface including said primer coating to improve the adhesion between said gasket and said protective coating.

33. A vehicle lighting assembly according to claim 32, wherein said inner peripheral side surface of said lens includes a cooperating structure, said gasket being injected into said cooperating structure to provide mechanical interlocking of said gasket with said lens to form said lens module.

34. A vehicle lighting assembly according to claim 26, wherein said gasket includes a flange, said flange extending from said peripheral portion of said lens thereby defining a lip, and at least a portion of said lip being adapted to extend under a body panel of the vehicle.

35. A vehicle lighting assembly according to claim 34, wherein said lip of said gasket has a lateral dimension, said lateral dimension varying along a length of said gasket.

36. A vehicle lighting assembly according to claim 35, wherein said lip has a varying thickness.

37. A vehicle lighting assembly according to claim 34, wherein at least a portion of said lip of said gasket has a free end adapted for engaging at least a portion of the perimeter of an opening in the body of the vehicle.

38. A vehicle lighting assembly according to claim 26, wherein said lens module comprises an exterior lighting assembly lens module.

39. A vehicle lighting assembly according to claim 38, wherein said exterior lighting assembly lens module comprises a headlamp assembly lens module.

40. A vehicle lighting assembly according to claim 39, wherein said lens comprises a polycarbonate lens.

41. A vehicle lighting assembly according to claim 26, wherein said lens includes a contoured outer surface, said contoured outer surface being adapted to follow the contour of the body of the vehicle.

42. A vehicle lighting assembly according to claim 26, wherein said lens module includes a projecting flange, said projecting flange being secured to said housing to secure said lens module to said housing.

43. A vehicle lighting assembly according to claim 26, wherein said protective coating comprises at least one of an organic coating, an inorganic coating, and an organic/inorganic coating.

44. A vehicle lighting assembly according to claim 26, wherein said lens module includes an ultraviolet radiation absorber/stabilizer for protecting said lens from ultraviolet radiation damage.

45. A vehicle lighting assembly according to claim 44, wherein said ultraviolet absorber/stabilizer is incorporated into one of said lens and said protective coating for protecting said lens from ultraviolet radiation degradation.

46. A vehicle lighting assembly according to claim 44, said lens module further including an intermediate primer coating between said lens and said protective coating, said ultraviolet radiation absorber/stabilizer being incorporated into said intermediate primer coating for protecting said lens from ultraviolet radiation degradation.

47. A vehicular component assembly for positioning in a vehicle, said vehicular component assembly comprising:

a polymeric body having a protective coating, and at least one primer coating overlaying at least a portion of said protective coating; and a member integrally molded onto at least a portion of said primer coating.

48. A vehicular component assembly according to claim 47, further comprising an ultraviolet radiation absorber/stabilizer for protecting said polymeric body from ultraviolet radiation degradation.

49. A vehicular component assembly according to claim 47, wherein said polymeric body including at least one cooperating structure, said member being molded and extending into said cooperating structure to thereby mechanically interlock said member with said polymeric body.

50. A vehicular component assembly according to claim 47, wherein said polymeric body includes a peripheral portion, said peripheral portion having inner and outer peripheral side surfaces and a peripheral edge surface, said member being molded onto at least a portion of said primer coating on at least one of said inner and outer peripheral side surfaces and said peripheral edge surface to form a gasket, and said gasket being adapted to cover a gap between said polymeric body and an opening in the vehicle.

51. A vehicle component assembly according to claim 50, wherein said member is injection molded on said inner peripheral side surface of said polymeric body.

52. A vehicle component assembly according to claim 51, wherein at least a portion of said inner peripheral side surface includes a projecting lip, said projecting lip mechanically interlocking said member with said polymeric body.

53. A vehicle component assembly according to claim 47, wherein said protective coating comprises one of an organic coating, an inorganic coating, and an organic/inorganic coating.

54. A vehicle component assembly according to claim 47, wherein said at least one primer coating comprises a first primer coating, said body including a second primer coating over said first primer coating, said first primer coating improving the adhesion between said second primer coating and said protective coating, said second primer coating improving the adhesion between said member and said first primer coating.

55. A vehicle component assembly according to claim 47, wherein said member comprises one of a melt-processible gasket material and a non melt-processible gasket material.

56. A vehicle component assembly according to claim 55, wherein said member comprises a melt-processible gasket material selected from the group including polyvinyl chloride, a styrene/butadiene/styrene elastomer, a styrene/ethylene/butadiene/styrene elastomer, a copolyester elastomer, a polyether blockamide, a thermoplastic urethane, a styrene butadiene rubber elastomer, an ethylene propylene diene terpolymer elastomer, and an ethylene propylene copolymer elastomer.

57. A vehicle component assembly according to claim 55, wherein said member comprises a urethane.

58. A vehicle component assembly according to claim 47, wherein said polymeric body comprises a lens for a lighting assembly.

59. A vehicle component assembly according to claim 58, further comprising an ultraviolet radiation absorber/stabilizer for protecting said polymeric body from ultraviolet radiation degradation.

60. A method of attaching a molded member to a polymeric vehicle element, the method comprising the steps of:
   providing a polymeric vehicle element, the polymeric vehicle element having a protective coating;
   applying a primer to a predetermined area of the protective coating; and
   forming an integrally molded member on at least a portion of the predetermined primed area from a gasket material, the primer bonding the molded member to the protective coating and the polymeric vehicle element.

61. A method according to claim 60, wherein forming a member comprises injection molding the gasket molding material onto the polymeric element.

62. A method according to claim 61, wherein injection molding comprises reaction injection molding the molded member onto the polymeric element.

63. A method according to claim 60, wherein applying a primer includes applying at least one glass primer selected from the group consisting of an acrylic-based glass primer and a urethane-based glass primer.

64. A method according to claim 60, further including allowing the glass primer to flash completely.

65. A method according to claim 60, wherein applying a primer to the polymeric vehicle element comprises:
   applying a first primer to the predetermined area; and
   applying a second primer to the predetermined area after the first primer, the first primer improving the adhesion between the protective coating and the second primer, the second primer improving the adhesion between the first primer and the molded member.

66. A method according to claim 60, wherein applying a primer to the vehicle element comprises applying a primer to a peripheral portion of the element.

67. A method according to claim 61, wherein injection molding a gasket molding material includes injection molding one of a melt-processible gasket material and a non melt-processible gasket material onto the polymeric vehicle element.

68. A method according to claim 60, further comprising preheating the vehicle polymeric element prior to applying the primer to the element.

69. A method according to claim 68, wherein preheating the vehicle polymeric element comprises applying warm air to the polymeric element.

70. A method according to claim 60, wherein said providing a polymeric vehicle element includes providing a protective coated polymeric vehicle element having an ultraviolet radiation absorber/stabilizer incorporated therein.

* * * * *